United States Patent [19]
Cameron et al.

[11] Patent Number: 6,025,071
[45] Date of Patent: Feb. 15, 2000

[54] REMOVABLE GRADE HOT MELT PRESSURE SENSITIVE ADHESIVE

[75] Inventors: Janelle C. Cameron, Mendota Heights; Jeffrey S. Lindquist, Cottage Grove, both of Minn.

[73] Assignee: H.B.Fuller Licensing & Financing Inc., St. Paul, Minn.

[21] Appl. No.: 08/956,887

[22] Filed: Oct. 23, 1997

[51] Int. Cl.⁷ .............................. C09J 7/02; C09J 153/00
[52] U.S. Cl. ........................... 428/355 RA; 428/355 BL; 525/89; 525/98; 525/314
[58] Field of Search ...................... 428/355 RA, 355 BL; 525/89, 98, 314

[56] References Cited

U.S. PATENT DOCUMENTS

| | | |
|---|---|---|
| H1402 | 1/1995 | Chin et al. . |
| 4,411,954 | 10/1983 | Butch, III et al. . |
| 4,460,364 | 7/1984 | Chen et al. . |
| 4,680,333 | 7/1987 | Davis . |
| 4,833,193 | 5/1989 | Sieverding . |
| 5,143,968 | 9/1992 | Diehl et al. . |
| 5,242,984 | 9/1993 | Dillman et al. ........................ 525/314 |
| 5,266,394 | 11/1993 | Diehl et al. . |
| 5,292,806 | 3/1994 | Diehl et al. . |
| 5,292,819 | 3/1994 | Diehl et al. . |
| 5,358,783 | 10/1994 | Diehl et al. . |
| 5,372,870 | 12/1994 | Diehl et al. . |
| 5,399,627 | 3/1993 | Diehl et al. . |
| 5,403,658 | 4/1995 | Southwick et al. . |
| 5,412,032 | 5/1995 | Hansen et al. . |
| 5,468,237 | 11/1995 | Miller et al. . |
| 5,559,165 | 9/1996 | Paul . |
| 5,869,562 | 2/1999 | Lindquist et al. ....................... 524/505 |
| 5,916,959 | 6/1999 | Lindquist et al. ....................... 524/505 |

OTHER PUBLICATIONS

Shell Chemical Company, KRATON™ Polymers for Adhesives and Sealants, Technical Bulletin SC–2426–96, obtained from http://www.shellchemicals.com/Kraton/sc2426–96.asp, Sep. 21, 1998.

*Primary Examiner*—Blaine Copenheaver

[57] ABSTRACT

A removable grade hot melt pressure sensitive adhesive, comprising from about 10% to about 50% by weight of the adhesive of at least one styrene-isoprene-styrene block copolymer having a diblock content of greater than about 50% a melt index of less than about 30 grams/10 minutes; from about 10% to about 40% by weight of the adhesive of at least one tackifying resin having a softening point of less than about 120° C. and from about 10% to about 50% by weight of the adhesive of a liquid plasticizer. The resultant adhesive has 180° peel values to stainless steel of less than about 4.0 pounds per linear inch.

20 Claims, No Drawings

REMOVABLE GRADE HOT MELT PRESSURE SENSITIVE ADHESIVE

FIELD OF THE INVENTION

This invention relates to a removable grade hot melt pressure sensitive adhesive based on a styrene-isoprene-styrene block copolymer having a low melt index and a high A-B diblock ratio which provides excellent anchorage to a variety of base substrates, has excellent quick tack, low viscosity and low ultimate peel adhesion making it ideally suited for applications where removability is required.

BACKGROUND OF THE INVENTION

Hot melt pressure sensitive adhesives are a popular option for tape and label applications. There are several different grades of pressure sensitive adhesives including permanent grades, semi-permanent grades, removable grades and freezer grades.

Permanent grade adhesives are utilized where it is desired to permanently adhere one substrate to another. These adhesives typically have high peel adhesion values and are utilized for applications such as mailing labels, bottle labels, case seal tape, tamper evident bag closures and so forth.

Semi-permanent grade or repositionable adhesives allow a substrate to be removed for a short period of time after application. These adhesives are designed so that adhesion builds over time until the bond is permanent. These adhesives have good adhesion at refrigerator temperatures. These grades are used for food label applications, i.e. dairy products, for instance.

Freezer grade adhesives are designed to have good adhesion to substrates to temperatures as low as about −30° C. These adhesives are used for frozen food labels and freezer shelf identification.

Removable grade hot melt pressure sensitive adhesives are designed to allow removability of one substrate from another at any time after application. These adhesives, therefore, do not build significantly in peel values or adhesion over time, or in other words, upon aging of the adhesive bond. These adhesives typically have low peel adhesion values. Typical applications include magazine tipping, credit card attachment, removable store shelf marking for sale items, labels for electronics and appliances and so forth.

Hot melt pressure sensitive adhesives typically comprise a block copolymer, a tackifying resin and a plasticizing oil. The block copolymer provides flexibility, integrity and smooth peel adhesion properties. It also further provides a medium for dissolution or suspension of the tackifying resin and the plasticizing oil. The tackifying resin enhances tack properties and adhesion and reduces viscosity and the plasticizing oil reduces peel values, viscosities, glass transition temperatures and storage modulus (G'), and increases flexibility. The low ultimate peel value and lower peel adhesion of the removable adhesive is achieved through the use of higher polymer and plasticizing oil concentrations and lower tackifying resin concentrations in the adhesive. The low levels of tackifier and high polymer and oil concentrations can lead to several problems.

There are many requirements that must be met in the development of removable grade hot melt pressure sensitive adhesives including low viscosities at application temperatures of less than about 175° C., high heat resistance, good cold temperature flexibility, resistance to cold flow, good adhesion to the base substrate, high resistance to bleeding or staining of substrates, good die-cuttability and good quick tack or quick stick. The difficulty in formulating such adhesives is achieving a good balance of desirable properties without sacrificing one property to another. For instance, high heat resistance may be achieved at the expense of good cold temperature flexibility, lower viscosity may be achieved at the expense of stain resistance due to either higher levels of the liquid components or lower levels of polymer, good cold temperature flexibility may be achieved at the expense of resistance to what is known as "cold flow" at room temperature and adhesion and quick tack may be sacrificed to obtain lower, smoother peel characteristics to mention only a few examples.

One of the main concerns in the development of removable grade hot melt pressure sensitive adhesives is poor adhesion to the substrate to which the adhesive is applied in its molten state, or in other words the "base substrate." This phenomenon is referred to in the industry as poor anchorage. This is more of a problem with removable grades because the level of tackifying resin must be relatively low in order to retain removability but because the tackifying resin is the primary adhesion promoter, it can also lead to poor anchorage. The adhesive may detach from the base substrate prior to application of the substrate to another surface or there may be poor bonding of the base substrate to a second surface.

Another problem often encountered is poor stain resistance. Block copolymers act as a means or vehicle for solvating or in other words suspending both liquid components and solid tackifying resins. Block copolymers may have many configurations including A-B-A triblock, A-B diblock, radial and Y-block and A-B-A-B-A-B multiblock configurations. The A block is most commonly styrene and the B block may be ethylene/butylene, ethylene/propylene, isoprene or butadiene. The liquid components may associate with either the A block, often referred to as the endblock, or the B block, often referred to as the midblock, depending on the chemical formula and compatibility. Plasticizers such as oils and midblock associating liquid resins are often used to lower the viscosity, increase flexibility, lower the glass transition temperature and increase the storage modulus or G'. They are also used in removable grades to lower the ultimate peel value. High levels of liquid components relative to the level of polymer may lead to poor stain resistance, however.

Removability can also be accomplished through the use of higher polymer contents but this leads to high viscosities and products which cannot be applied to substrates easily. It can also be achieved through the use of higher molecular weight liquid components such as liquid elastomers but this also leads to higher viscosities. The use of plasticizing oils is often preferable for these reasons. However, high levels of oil can cause staining due to the fact that the polymer can only solvate so much oil before the oil begins to migrate. This migration leads to substrate staining and deterioration of adhesive performance upon aging of the adhesive bond.

A third problem encountered is a build in peel adhesion over time which can ultimately destroy the removability causing undesirable substrate failure and adhesive residue on surfaces to which the base substrate is applied.

There is a continuing need in the art to achieve removable grade hot melt pressure sensitive adhesives which retain an excellent balance of properties. There has especially remained a need in the development of removable grade hot melt pressure sensitive adhesives to have adhesion to base substrates and excellent quick tack while retaining low ultimate peel adhesion, low viscosity and good stain resistance. Good adhesion is typically achieved through the use of high levels of tackifying resin which also reduces the ability to remove the base substrate from other surfaces at a much later date. However, reducing the tackifying resin also reduces the initial adhesion or anchorage to the base substrate. There has been a constant effort in the pressure sensitive adhesive industry to achieve a product with excellent initial adhesion to the base substrate when applied in the molten state, and yet allow easy removability of the adhesive from a surface to which it is applied, by hand pressure for instance, once it is cool.

The present inventors have found hot melt pressure sensitive adhesive compositions which have excellent anchorage to the base substrate, excellent quick tack and excellent stain resistance while retaining a low viscosity and low ultimate peel adhesion therefore achieving a superior balance of properties.

SUMMARY OF THE INVENTION

This invention relates to removable grade hot melt pressure sensitive adhesive compositions comprising from about 10% to about 50% by weight of the adhesive of at least one styrene-isoprene-styrene block copolymer having a diblock content greater than about 50%; from about 10% to about 40% by weight of the adhesive of a tackifying resin having a softening point of less than about 120° C. and from about 10% to about 50% by weight of the adhesive of a liquid component.

This invention further relates to a removable label, comprising a substrate and a hot melt applied on said substrate said hot melt comprising from about 10% to about 50% by weight of the adhesive of at least one styrene-isoprene-styrene block copolymer having a diblock content of greater than about 50%; from about 10% to about 40% by weight of the adhesive of at least one tackifying resin having a softening point of less than about 120° C.; and from about 10% to about 50% by weight of the adhesive of a liquid plasticizer.

The 180° peel values to stainless steel of the resultant adhesive are less than about 4.0 pounds per linear inch (pli) or about 715 grams/centimeter, preferably less than about 3.5 pli (about 625 g/cm), more preferably less than about 3.0 pli (about 540 grams/cm), even more preferably less than about 2.0 pli (about 360 g/cm), even more preferably less than about 1.5 pli (about 270 g/cm) and most preferably less than about 1.0 pli (about 180 g/cm). These adhesives exhibit excellent initial adhesion to a base substrate to which they are applied in the molten state, yet are easily and cleanly removed from a subsequent application surface to which they are applied in the cool state. They have excellent quick tack, excellent stain resistance and low viscosities in the molten state.

DETAILED DESCRIPTIONS OF THE PREFERRED EMBODIMENTS

The block copolymers preferable to the present invention are those block copolymers having a linear configuration and having styrene endblocks and isoprene midblocks (SIS). The styrene content is preferably from about 10% to about 35% by weight of the block copolymer, more preferably from about 10% to about 25% by weight and most preferably from about 15% to about 25% by weight of the block copolymers. The block copolymers useful herein are preferably a blend of A-B-A triblock and A-B diblock. This ratio is referred to as the coupling efficiency or diblock content of the block copolymer. Thus the coupling efficiency is inversely proportional to the diblock content. For instance, a block copolymer having a coupling efficiency of 100% would have no diblock concentration and a block copolymer having a coupling efficiency of 65% would have 35% A-B diblock and 65% A-B-A triblock. It is preferable to the present invention that these polymers have a coupling efficiency of less than about 50% or a diblock concentration greater than about 50%. It is also preferable that these block copolymers have a melt index of less than about 30 grams per 10 minutes as measured by ASTM Method D 1238, Condition G, and more preferably that the melt index is less than about 25 g/10 min., even more preferably from about 15 g/10 min. to about 25 g/10 min. and most preferably from about 20 g/10 min. to about 25 g/10 min. It is surmised that the high diblock content is contributing to the superior anchorage or bonding to the base substrate. Useful examples include Kraton® D 1113 (16% styrene, 55% diblock and a melt index of about 24 g/10 min.) and Kraton® D 1119 (22% styrene, 65% diblock and a melt index of about 25 g/10 min.). These polymers are available from the Shell Chemical Co. in Houston, TX. Other examples include Quintac SL-113 (about 21% styrene and about 79% diblock) available from Nippon Zeon and JSR-SIS-5501 (about 15% styrene and about 70% diblock) available from Japan Synthetic Rubber Co. These polymers are generally useful from about 10% to about 60% by weight of the adhesive and preferably from about 10% to about 50% by weight of the adhesive.

Other polymers may also be added to the compositions of the present invention. These polymers include styrene-butadiene-styrene (SBS) block copolymers having a styrene content from about 10% to about 30% by weight of the block copolymer and a diblock content from about 50% to about 90% by weight of the block copolymer. An example of a useful block copolymer is Solprene® 1205, a tapered SBS block copolymer having a diblock content of about 90% by weight and a styrene content of about 25% by weight. This polymer is available from Fina Oil & Chemical Co. in Houston, Tex. and from Housmex, Inc. in Houston, Tex. Other diblock copolymers having these characteristics are available from Shell Chemical Co. under the tradename of Kraton® D. These block copolymers are useful from 0% to about 30% by weight of the adhesive composition, preferably from 0% to about 20% by weight and more preferably from 0% to about 10% by weight of the adhesive composition.

Optionally, other SIS block copolymers may also be utilized in the compositions of the present invention. The useful polymers are those which preferably have a styrene content from about 15% to about 30% by weight of the block copolymer and a diblock content from 0% to about 30% by weight of the block copolymer. Examples of useful block copolymers include Kraton® D 1111, a linear SIS block copolymer having a styrene content of about 22% by weight of the block copolymer and a diblock content of about 15% by weight of the block copolymer. Other useful SIS block copolymers of this nature would include those manufactured by Dexco Polymers in Plaquemine, La. and include Vector® 4111 (18% styrene and 0% diblock), Vector® 4113 (15% styrene and 18% diblock) and Vector® 4211 (30% styrene and 0% diblock). These polymers are useful from 0% to about 20% by weight of the adhesive composition and preferably from 0% to about 15% by weight of the adhesive composition. If the concentration of these polymers is too high, the product does not have superior adhesion or anchorage to the base substrate.

One of skill in the art would understand that other polymers that do not materially change the important characteristics of these compositions could be optionally added including other block copolymers such as styrene-ethylene/butylene-styrene block copolymers and styrene-ethylene/propylene-styrene block copolymers; homopolymers, copolymers and terpolymers of ethylene; homopolymers, copolymers and terpolymers of propylene and interpolymers of ethylene and at least one $C_3$ to $C_{20}$ alphaolefin. These polymers may be added in small amounts which would not materially alter removability, adhesion, quick tack and stain resistance.

The tackifying resins useful to the present invention include aliphatic, cycloaliphatic and aromatic hydrocarbon resins, modified hydrocarbons and hydrogenated versions thereof, terpenes, modified terpenes and hydrogenated versions thereof and rosins, modified rosins and hydrogenated versions thereof. The softening point of these resins is preferably less than about 120° C., more preferably less than about 110° C. and even more preferably less than about 100° C. These tackifying resins are generally commercially available with differing levels of hydrogenation. Useful resins include Eastotac™ H-1 15 and more preferably Eastotac® H-100, partially hydrogenated cycloaliphatic petroleum hydrocarbon resins with softening points of 115° C. and 100° C., respectively. These resins are available in the E grade, R grade, L grade and W grade indicating increasing levels of hydrogenation and therefore lighter color respectively. They are available from Eastman Chemical Co. in Kingsport, Tenn. Other available resins include Escorez™ 5300 and Escorez™ 5400, partially hydrogenated cycloaliphatic petroleum hydrocarbon resins, and Escorez™ 5600, a partially hydrogenated aromatic modified petroleum hydrocarbon resin all having softening points of about 100° C. and available from Exxon Chemical Company in Houston, Tex.; Wingtack™ Extra which is an aliphatic, aromatic petroleum hydrocarbon resin, Wingtack™ 86, an aromatic modified synthetic polyterpene hydrocarbon resin and Wingtack 95, a synthetic polyterpene all having softening points of less than about 100° C. and available from Goodyear Tire and Rubber Co. in Akron, Ohio and Arkon® P-70, P-90 and P-100, synthetic petroleum hydrocarbon resins having softening points of 70° C., 90° C. and 100° C. consecutively and available from Arakawa Chemical (USA) Inc. in Chicago, Ill. Further examples include Hercolite™ 2100 which is a partially hydrogenated cycloaliphatic petroleum hydrocarbon resin available from Hercules, Inc. in Wilmington, Del. and Zonatac™ 105 Lite which is a styrenated terpene hydrocarbon resin, made from d-limonene and available from Arizona Chemical in Panama City, Fla. Useful modified rosins include Sylvatac™ 1103 and Zonester™ 100 available from Arizona Chemical and Permalyn 305 available from Hercules which are all pentaerythritol rosin esters. All of these resins also have softening points of less than about 100° C. Sylvatac™ 1085, an 85° C. softening point glycerol rosin ester of tall oil is another example of a useful rosin based tackifier. It should be noted that there are numerous types of rosins and modified rosins with differing levels of hydrogenation including gum rosins, wood rosins, tall-oil rosins, distilled rosins, dimerized rosins and polymerized rosins. Some specific modified rosins include glycerol and pentaerythritol esters of wood rosins and tall-oil rosins.

Examples of useful pure alphamethyl styrene resins are Kristalex™ 3070 (70° C. softening point), 3085 (85° C. softening point) and 3100 (100° C. softening point) available from Hercules in Wilmington, Del.

In a preferred embodiment the composition utilizes at least one tackifying resin which is an at least partially hydrogenated aromatic hydrocarbon resin having a softening point of less than about 100° C. or a rosin ester having a softening point of less than about 90° C. These resins are useful from about 10% to about 35% by weight of the composition and preferably from about 10% to about 25% by weight of the adhesive composition.

A liquid component is necessary to the adhesives of the present invention. These liquid components may be plasticizing oils, liquid elastomers including polybutene and polyisobutylenes and liquid tackifying resins. These liquid components provide fluidity to the adhesives and decrease viscosities, peel values and storage modulus (G') and generally lower the glass transition temperatures. The plasticizing oils useful herein may include mineral and petroleum based hydrocarbon oils. The oils used are primarily hydrocarbon oils which are generally low in aromatic content and are paraffinic or naphthenic in character. The oils may comprise both naphthenic and paraffinic character. The oils are preferably low in volatility, transparent, and have as little color and odor as possible. This invention also contemplates the use of vegetable oils and their derivatives and similar plasticizing liquids.

Examples of useful plasticizers include Calsol® 5120, a naphthenic petroleum based oil available from Calumet Lubricants Co. in Indianapolis, Ind; Kaydol® White Mineral Oil, a paraffinic mineral oil available from Witco Corp. in New York, N.Y. and Tufflo Process Oil 6056 available from Lyondell Petrochemicals in Houston, Tex. One skilled in the art would recognize that any generic 500 second or 1200 second naphthenic process oil would also be useful. The liquid tackifying resins useful herein include Escorez® 2520, a liquid aromatic hydrocarbon resin with a pour point of 20° C. available from Exxon Chemical Co.; Regalrez® 1018, a liquid hydrogenated aromatic hydrocarbon resin with a pour point of 18° C. available from Hercules, Inc. in Chicago, Ill; Sylvatac® 5N, a liquid resin of modified rosin ester with a pour point of 5° C. available from Arizona Chemical Co. and Piccolastic® A5, a liquid pure alphamethyl styrene resin with a pour point of 5° C. available from Hercules, Inc.

Other optional ingredients may also be added to the adhesives of the present invention providing that these ingredients do not adversely affect the removability and nonstaining characteristics of the adhesive. Such other ingredients may include other block copolymers; homopolymers, copolymers and terpolymers of ethylene including ethylene vinyl acetate copolymers, ethylene n-butyl acrylate copolymers and ethylene methylacrylate copolymers; interpolymers of ethylene having at least one $C_3$ to $C_{20}$ alphaolefin and homopolymers, copolymers and terpolymers of propylene to mention only some examples.

A stabilizer or antioxidant is also preferably used in hot melt adhesives. These compounds are added to protect the adhesive from degradation caused by reaction with oxygen induced by such things as heat, light or residual catalyst from the raw materials such as the tackifying resin. Such antioxidants are commercially available from Ciba-Geigy in Hawthorne, N.Y. and include Irganox® 565, 1010 and 1076 which are hindered phenols. These are primary antioxidants which act as radical scavengers and may be used alone or in combination with other antioxidants such as phosphite antioxidants like Irgafos® 168 available from Ciba-Geigy. Phosphite catalysts are considered secondary catalysts and are not generally used alone. These are primarily used as peroxide decomposers. Other available catalysts are Cyanox® LTDP available from Cytec Industries in Stamford, Conn., and Ethanox® 1330 available from Albemarle Corp. in Baton Rouge, La. Many such antioxidants are available either to be used alone or in combination with other such antioxidants. These compounds are added to the hot melts in small amounts and have no effect on other physical properties. Other compounds that could be added that also do not affect physical properties are pigments which add color, or fluorescing agents, to mention only a couple. Additives like these are known to those skilled in the art.

The resultant adhesives are characterized as being removable or releasable hot melt pressure sensitive adhesives having 180° peels to stainless steel of less than about 4.0 pounds per linear inch (about 715 grams/cm), preferably less than about 3.5 pli (about 625 g/cm), more preferably less than about 3.0 pounds pli (about 540 g/cm), even more preferably less than about 2.0 pli (about 360 grams/cm), even more preferably less than about 1.5 pli (about 270 g/cm) and most preferably less than about 1.0 pli (about 180 g/cm). These compositions allow for clean removability of a base substrate from a variety of surfaces.

The adhesives are applied to the surface of a base substrate or article in a continuous or discontinuous pattern. The adhesive is permanently adhered to at least one surface of an article and is then removably attached to a second surface in order to secure the article or substrate for a period of time. It is desirable that the adhesive be removable from the surface to which the base substrate or article is applied any time after application without adhesive transfer or any adhesive residue on the secondary surface which may be fabric, paper, skin, metal, plastic and so forth.

These adhesives are superior to those compositions previously available in that they have superior adhesion to the base substrate or article and leave no residue on these secondary surfaces and allow for a smooth, clean removal of the base substrate. This is of particular importance to the labeling industry for applications such as removable store shelf marking for sale items, credit card attachment, magazine tipping, any type of stickers, labels for new electronics and appliances, tapes and so forth. It is also of particular importance for disposable nonwoven articles including use as a positioning adhesive for feminine napkins and pantiliners, for adult incontinent pads, for diapers and for medical applications including skin attachment adhesives used for plasters, gauze and bandages. In the latter cases, it is important that the adhesive removably adhere the base substrate or article to fabric or skin without adhesive transfer or residue. For instance, a pantiliner must cleanly adhere to a panty without leaving any sticky residue upon removal and a bandaid should cleanly adhere to skin without leaving any residue on the skin or sticking undesirably to hair on the surface of the skin.

These adhesives may be applied to the base substrate using any coating technique available. This includes continuous methods such as slot die coating, roll coating and gravure coating and discontinuous methods including non-contact spiral spray and fiberization techniques. The compositions may also be pattern coated or screen applied.

The most typical methods are slot die coating for a continuous pattern and screen application for a discontinuous pattern in amounts between about 6 to 12 pounds per 3000 linear feet (about 9 g/m$^2$ to about 20 g/m$^2$). The viscosities of these compositions allows them to be applied using any standard hot melt application equipment.

Once applied to the base substrate, these adhesives are characterized as having excellent anchorage to the base substrate. In other words, they have excellent adhesion to the base substrate.

The resultant compositions are further characterized as having excellent quick-tack, quick-stick or wet-out. Any of the terms are used by one of skill in the art. The compositions of the present invention preferably have loop tack values of greater than about 20 oz/in$^2$ (about 85 g/cm$^2$), more preferably greater than about 30 oz/in$^2$ (about 130 g/cm$^2$) and most preferably greater than about 40 oz/in$^2$ (about 175 g/cm$^2$). For compositions having a peel value of less than about 2.0 pli (about 360 g/cm) it would be difficult to achieve values much higher than about 40 oz/in$^2$ without adversely affecting other preferred characteristics such as the 180° peel values. For those compositions having 180° peel values of greater than about 3.0 pli (about 540 g/cm) the loop tack values may be higher.

In the labeling industry, it is preferable that the compositions have 180° peel values to stainless steel of less than about 2.0 pli (about 360 g/cm), more preferably less than about 1.5 pli (about 270 g/cm) and most preferably less than about 1.0 pli (about 180 g/cm). Lower peel values are especially important when the surface to which the base substrate or article is being applied is any type of paper substrate. Those compositions having higher peel values may more easily tear such a surface.

The compositions are further characterized as having excellent long-term stain resistance as tested by TMHM 195, having preferably no staining at about 50° C. after one week and very slight staining at temperatures of about 60° C. after one week. It is particularly difficult to achieve good stain resistance to paper substrates and surprisingly, these compositions have superior stain resistance.

The following non-limiting examples further help to illustrate the compositions of the present invention.

EXAMPLES

Test Methods:

1. Melt Viscosities

The melt viscosities of the hot melt adhesives were determined on a Brookfield Thermosel Viscometer Model DV-II+ using a number 27 spindle.

2. 180° Peel Adhesion To Stainless Steel

Peel values were determined using test method #PSTC-1. About 1 mil adhesive film is coated onto polyester (Mylar®) film out of a solvent blend using a Baker Applicator. Samples are then cut into 1 inch×8 inch strips (2.54 cm×20.32 cm) for determining peel values.

3. Loop Tack, Quick Tack or Quick Stick

A film of adhesive about 1 mil thick is coated onto polyester (Mylar®) film out of a solvent solution. The film is allowed to dry for a minimum of 24 hours. The film is then mated with release liner, and cut into 1 inch×5 inch strips (2.54 cm×12.7).

A test sample is then inserted into a Chemsultants International Loop Tack Tester with the adhesive side facing out (release liner removed). The Loop Tack Tester automatically records the tack value in oz/in$^2$.

4. Staining Test

H. B. Fuller Test Method TMHM 195 was used to determine staining resistance. The samples are solvent coated onto Mylar® polyester material at a 1 mil adhesive thickness. A 3 inch×3 inch square of the coated sample is then placed on a single sheet of standard white notebook paper. Tests are run at least in triplicate. Each sample is then placed in a separate envelope and placed in an oven at about 50° C. and in an oven at about 60° C. The samples are checked after 24 hours and again after 1 week. The backside of the paper is checked for any staining.

5. Shear Adhesion Failure Temperature (SAFT)

H. B. Fuller Test Method TMHM 019 was used to determine the SAFT values in ° C. The adhesive composition is again solvent coated onto Mylar® polyester manufactured by the Du Pont de Nemours in Wilmington, Del. at a coat weight of about 25 g/m². The solvent is allowed to evaporate. The sample is cut into 1 inch×3 inch (2.54 cm×7.62 cm) strips and two coated strips are laminated together overlapping a 1 inch×1 inch (2.54×2.54 cm) area being careful not to entrap air bubbles. The remaining coated strip of adhesive may be covered with release liner. A 500 gram weight is then suspended to one end of the resultant laminate which is then suspended from the ceiling by clamps in a progammable forced air oven. The oven temperature is ramped at a rate of 25° C. per hour and the temperature at which the specimen fails is recorded. This measurement is used as an indication of the heat resistance of the composition which is important for shipping.

TABLE I

|  | 1 | A | B | C |
|---|---|---|---|---|
| Kraton ® D 1119 SIS block copolymer | 45 | — | — | — |
| Kraton ® D 1117 SIS block copolymer | — | 45 | — | — |
| Kraton ® D 1107 SIS block copolymer | — | — | 45 | — |
| Kraton ® D 1111 SIS block copolymer | — | — | — | 45 |
| Arkon ® P-90 hydrocarbon resin | 20 | 20 | 20 | 20 |
| Piccolastic ® A-5 liquid resin | 9 | 9 | 9 | 9 |
| 500 second process oil | 25 | 25 | 25 | 25 |
| Loop Tack Values (g/cm²) | 44 oz/in² (194) | 27 oz/in² (119) | 25 oz/in² (110) | 32 oz/in² (141) |
| Visc @ about 175° C. | 9650 cPs | 7600 cPs | 19750 cPs | 23500 cPs |
| 180° Peel-Stainless (grams/cm) | 1.2 pli 215 g/cm | — | — | — |

Table I illustrates the superior quick tack properties as measured by the loop tack values which are achieved through the use of a styrene-isoprene-styrene polymer of the present invention. The aggressive tack is favorable for removable adhesives. The 180° peel to stainless steel is present to show the removability of the composition.

Example 2

A blend of 13% Kraton D 1113 SIS block copolymer (16% styrene, 55% diblock and a melt index of 24); 12% Kraton D 1111 SIS block copolymer (22% styrene, 15% diblock and a melt index of 3); 8% Solprene 1205 SBS block copolymer, 19.5% Wingtack 86 hydrocarbon resin; 20% Escorez® 2520 liquid hydrocarbon resin with a pour point of 20° C.; 24.5% 500 second process oil; 1% Irganox® 1010 hindered phenolic antioxidant and 2% RM-6060 coextrusion coating available from the H. B. Fuller Co. in St. Paul, Minn. was prepared by blending about 75% of the Wingtack® 86 hydrocarbon resin with all of the block copolymers and the antioxidant in a high shear mixer at a temperature of between about 150° C. and 175° C. for 40–50 minutes under a nitrogen blanket or until the blend is homogeneous and then slowly adding all of the other ingredients so as not to cause separation of the components. Each of the ingredients is measured as a weight percentage of the finished adhesive.

The product may then be coextruded with 2% by weight of the adhesive of a coextrusion coating, RM-6060, supplied by the H. B. Fuller Co. located in St. Paul, Minn.

The resultant adhesive had 180° peels to stainless steel of 1.9 pounds per linear inch (about 340 g/cm), a viscosity of 3,900 cPs at about 175° C. and a loop tack value of about 46 oz/in² (about 202 g/cm²).

Example 3

A blend of 25.0% Kraton D 1119, 10.0% Kraton D 1111, 37.5% Zonatac 105 Lite hydrocarbon resin, 22.5% 500 second process oil, 0.5% Irganox 1010 antioxidant, 0.5% Irganox 1076 antioxidant and 4.0% RM-6197 white pigment supplied by the H. B. Fuller Co. located in St. Paul, Minn. Each of the ingredients was measured as a weight percent of the finished adhesive. The mixture was prepared as in Example 2.

The resultant adhesive had 180° peels to stainless steel of about 3.2 pli (about 572 g/cm), loop tack values of about 74.5 oz/in² (328 g/cm²), a SAFT at a 500 g/in² load of about 115° C., and a viscosity at about 175° C. of about 5000 cPs. It was found to be a superior skin attachment adhesive.

We claim:

1. A removable grade hot melt pressure sensitive adhesive, comprising:
    a) from about 10% to about 50% by weight of the adhesive of at least one styrene-isoprene-styrene block copolymer having a diblock content of greater than about 50%;
    b) from about 10% to about 40% by weight of the adhesive of at least one tackifying resin having a softening point of less than about 120° C.; and
    c) from about 10% to about 50% by weight of the adhesive of a liquid plasticizer;
    wherein the 180° peel value to stainless steel of the resultant adhesive is less than about 4.0 pounds per linear inch (about 715 grams per centimeter).

2. The adhesive of claim 1 wherein the peel value is less than about 2.0 pounds per linear inch (about 360 grams per centimeter).

3. The adhesive of claim 1 wherein the adhesive has a loop tack value of greater than about 40 ounces per inch squared (about 175 grams/cm²).

4. The adhesive of claim 1 wherein the styrene-isoprene-styrene block copolymer has a diblock content from greater than about 50% to about 80% by weight of the block copolymer.

5. The adhesive of claim I wherein the styrene-isoprene-styrene block copolymer has a melt index of less than about 30 grams/10 minutes.

6. The adhesive of claim 1 wherein the styrene-isoprene-styrene block copolymer has a melt index from about 15 grams/10 minutes to about 25 grams/10 minutes.

7. The adhesive of claim 1 further comprising from 0% to about 30% by weight of a styrene-butadiene-styrene block copolymer having a styrene content from about 10% to about 30% by weight of the block copolymer and a diblock content from about 50% to about 90% by weight of the block copolymer.

8. The adhesive of claim 1 further comprising from 0% to about 20% by weight of a styrene-isoprene-styrene block copolymer having a styrene content from about 15% to about 30% by weight of the copolymer and diblock content from 0% to about 30% by weight of the block copolymer.

9. The adhesive of claim I wherein the adhesive has a viscosity of less than about 10,000 cPs at about 175° C.

10. The adhesive of claim 1 wherein the adhesive is permanently coated onto at least one surface of an article and said article is removably attached to skin wherein said article is capable of being released easily from said skin without adhesive transfer or residue.

11. The adhesive of claim 10 wherein the resultant adhesive has a 180° peel to stainless steel of less than about 3.5 pounds per linear inch (about 625 grams per centimeter).

12. A removable label, comprising:
  a) a substrate; and
  b) a movable hot melt coated on at least one surface of said substrate said hot melt pressure sensitive adhesive comprising:
    i) from about 10% to about 50% by weight of the adhesive of at least one styrene-isoprene-styrene block copolymer having a diblock content greater than about 50%;
    ii) from about 10% to about 40% by weight of the adhesive of at least one tackifying resin having a softening point of less than about 120° C.; and
    iii) from about 10% to about 50% by weight of the adhesive of a liquid plasticizer;
  wherein the 180° peel value to stainless steel of the resultant adhesive is less than about 2.0 pounds per linear inch (about 360 grams per centimeter).

13. The label of claim 12 wherein the peel value to stainless steel of the resultant adhesive is less than about 1.5 pounds per linear inch (about 270 grams per centimeter).

14. The label of claim 12 wherein the adhesive has a loop tack value of greater than about 40 ounces per inch squared (about 175 grams/cm$^2$).

15. The label of claim 12 wherein the styrene-isoprene-styrene block copolymer has a diblock content from greater than about 50% to about 80% by weight of the block copolymer.

16. The label of claim 12 wherein the styrene-isoprene-styrene block copolymer has a melt index of less than about 30 grams/10 minutes.

17. The label of claim 12 wherein the styrene-isoprene-styrene block copolymer has a melt index from about 15 grams/10 minutes to about 25 grams/10 minutes.

18. The label of claim 12 wherein the adhesive further comprising from 0% to about 30% by weight of a styrene-butadiene-styrene block copolymer having a styrene content from about 10% to about 30% by weight of the block copolymer and a diblock content from about 50% to about 90% by weight of the block copolymer.

19. The label of claim 12 wherein the adhesive further comprising from 0% to about 20% by weight of a styrene-isoprene-styrene block copolymer having a styrene content from about 15% to about 30% by weight of the block copolymer and a diblock content from 0% to about 30% by weight of the block copolymer.

20. The label of claim 12 wherein the adhesive has a viscosity of less than about 10,000 cPs at about 175° C.

* * * * *